United States Patent
Savian

(10) Patent No.: US 10,562,632 B2
(45) Date of Patent: Feb. 18, 2020

(54) AIRCRAFT STORAGE BIN BUCKET WITH SPACE EFFICIENT CORNER JOINT

(71) Applicant: C&D ZODIAC, INC., Huntington Beach, CA (US)

(72) Inventor: Scott Savian, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 186 days.

(21) Appl. No.: 15/677,931

(22) Filed: Aug. 15, 2017

(65) Prior Publication Data

US 2018/0050801 A1 Feb. 22, 2018

Related U.S. Application Data

(60) Provisional application No. 62/375,826, filed on Aug. 16, 2016.

(51) Int. Cl.
*B64D 11/00* (2006.01)
*E04B 2/60* (2006.01)

(52) U.S. Cl.
CPC .............. *B64D 11/003* (2013.01); *E04B 2/60* (2013.01); *Y10T 403/472* (2015.01)

(58) Field of Classification Search
CPC ......... B64D 11/003; E04B 2/60; E04C 2/205; F16B 12/44; F16B 12/46; Y10T 403/472; Y10T 403/555
See application file for complete search history.

(56) References Cited

U.S. PATENT DOCUMENTS

| | | | | |
|---|---|---|---|---|
| 5,746,038 A | * | 5/1998 | Houk | E04B 1/02 446/116 |
| 6,325,568 B1 | | 12/2001 | Druckman | |
| 6,782,672 B2 | * | 8/2004 | Staats | B32B 3/02 52/591.2 |
| 7,588,211 B2 | * | 9/2009 | Granzeier | B60R 7/04 244/118.5 |
| 7,988,091 B2 | * | 8/2011 | Wieding | G05G 15/08 244/118.5 |
| 8,097,108 B2 | * | 1/2012 | Wilde | B32B 27/00 156/182 |

(Continued)

OTHER PUBLICATIONS

International Search Report and Written Opinion issued in PCT/US17/47005.

*Primary Examiner* — Colleen M Chavchavadze
(74) *Attorney, Agent, or Firm* — Jeffer Mangels; Butler & Mitchell LLP; Brennan C. Swain, Esq.

(57) ABSTRACT

An aircraft storage bin that includes an upper housing and a bucket that cooperate to define a bin interior. The bucket is movable with respect to the upper housing between open and closed positions and includes a bottom and right and left side panels. The bottom includes lower and upper surfaces and right and left outer edges. The right and left side panels each include a first section having a first transverse width, a second section having a second transverse width, and a transition section that is located between the first and second sections. The second transverse width is less than the first transverse width. At least a portion of the second section of each of the side panels is received in a slot defined in the upper surface of the bottom of the bucket, such that the right and left side panels extend upwardly from the bottom.

16 Claims, 6 Drawing Sheets

(56) References Cited

U.S. PATENT DOCUMENTS

| | | | | |
|---|---|---|---|---|
| 8,590,837 | B2* | 11/2013 | Schneider | B64D 11/003 |
| | | | | 244/118.1 |
| 8,622,344 | B2* | 1/2014 | Vine | B64D 11/003 |
| | | | | 244/118.5 |
| 8,844,867 | B2* | 9/2014 | Graf | B64D 11/003 |
| | | | | 244/118.5 |
| 9,090,351 | B1* | 7/2015 | Frazier | B64D 11/003 |
| 9,810,251 | B2* | 11/2017 | Lewis | B64D 11/00 |
| 2005/0052516 | A1* | 3/2005 | Wilde | B32B 3/12 |
| | | | | 347/104 |
| 2005/0064174 | A1* | 3/2005 | Gideon | B29C 33/0072 |
| | | | | 428/317.9 |
| 2006/0132007 | A1* | 6/2006 | Beckley | B60R 7/04 |
| | | | | 312/325 |
| 2012/0325963 | A1 | 12/2012 | Young | |
| 2013/0269253 | A1* | 10/2013 | Graf | E05F 15/00 |
| | | | | 49/13 |
| 2014/0064833 | A1 | 3/2014 | Reeves | |
| 2017/0152045 | A1* | 6/2017 | Voss | B64D 11/003 |

\* cited by examiner

AIRCRAFT STORAGE BIN BUCKET WITH SPACE EFFICIENT CORNER JOINT

CROSS REFERENCE TO RELATED APPLICATIONS

This application claims the benefit of U.S. Provisional Application No. 62/375,826, filed Aug. 16, 2016, the entirety of which is incorporated herein by reference.

FIELD OF THE INVENTION

The present invention relates generally to an aircraft storage bin assembly, and more particularly to an aircraft storage bin assembly with a space efficient corner joint.

BACKGROUND OF THE INVENTION

Space within overhead storage bins in aircraft is always at a premium. Therefore, any advantage that can be provided by constructing a bin or a portion of a bin with extra space is a plus. In the construction of buckets for pivot bins, L-joint corner joints provide an unfinished edge that requires filling and sanding and does not provide for a shaped (rounded) corner. A typical T-joint requires a minimum distance from the joint to the edge of panel, thereby losing space in the bin. The present invention overcomes these issues and provides more space within the bin bucket than the prior art. In a preferred embodiment, the present invention is used with a bin and bucket such as those taught in U.S. Publication Nos. 2016/0236781 and 2017/0066533, the entireties of which are incorporated by reference herein. However, this is not a limitation and the space efficient corner joint taught herein can be used with other bins or in other situations outside of aircraft overhead storage bins.

SUMMARY OF THE PREFERRED EMBODIMENTS

In accordance with a first aspect of the present invention there is provided an aircraft storage bin that includes an upper housing and a bucket that cooperate to define a bin interior. The bucket is movable with respect to the upper housing between open and closed positions and includes a bottom and right and left side panels. The bottom includes lower and upper surfaces and right and left outer edges. The right and left side panels each include a first section having a first transverse width, a second section having a second transverse width, and a transition section that is located between the first and second sections. The second transverse width is less than the first transverse width. At least a portion of the second section of each of the side panels is received in a slot defined in the upper surface of the bottom of the bucket, such that the right and left side panels extend upwardly from the bottom.

In a preferred embodiment, the first section of the right side panel has an outer surface and an inner surface and the first section of the left side panel has an outer surface and an inner surface. The right outer edge defines a right outer plane and the left outer edge defines a left outer plane. The outer surface of the first section of the right side panel is closer to the right outer plane than the outer surface of the second section of the right side panel, and the outer surface of the first section of the left side panel is closer to the left outer plane than the outer surface of the second section of the left side panel.

Preferably, the second section of the right side panel comprises a plurality of fingers extending downwardly from the transition section that are received in a plurality of right side slots defined in the upper surface of the bottom, and the second section of the left side panel comprises a plurality of fingers extending downwardly from the transition section that are received in a plurality of left side slots defined in the upper surface of the bottom. In a preferred embodiment, the transition section on both the right and left side panel has a transverse width that decreases from the first width to the second width. Preferably, the transition section of the right side panel includes an inner surface and an outer surface, the inner surfaces of the first section, the transition section and the second section are parallel to one another, and the outer surfaces of the first section, the transition section and the second section are not parallel to one another.

In a preferred embodiment, a transition space is defined by an outer surface of the transition section and the upper surface of the bottom, and a decorative layer is secured to the upper surface of the bottom within the transition space. Preferably, an end of the decorative layer is positioned adjacent to the outer surface of the transition section.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
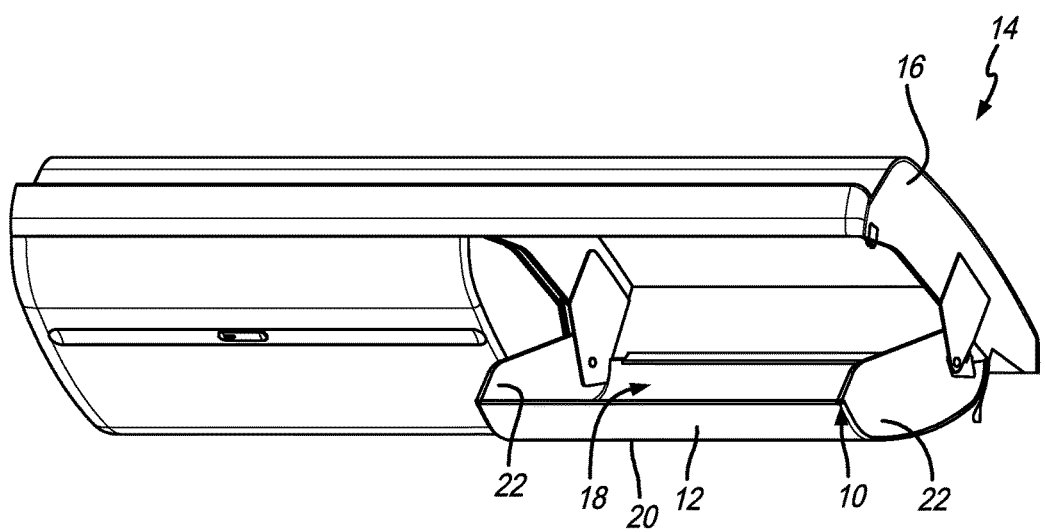
FIG. 1 is a perspective view of a pivot bin that incorporates the corner joint of the present invention.
Figure 2:
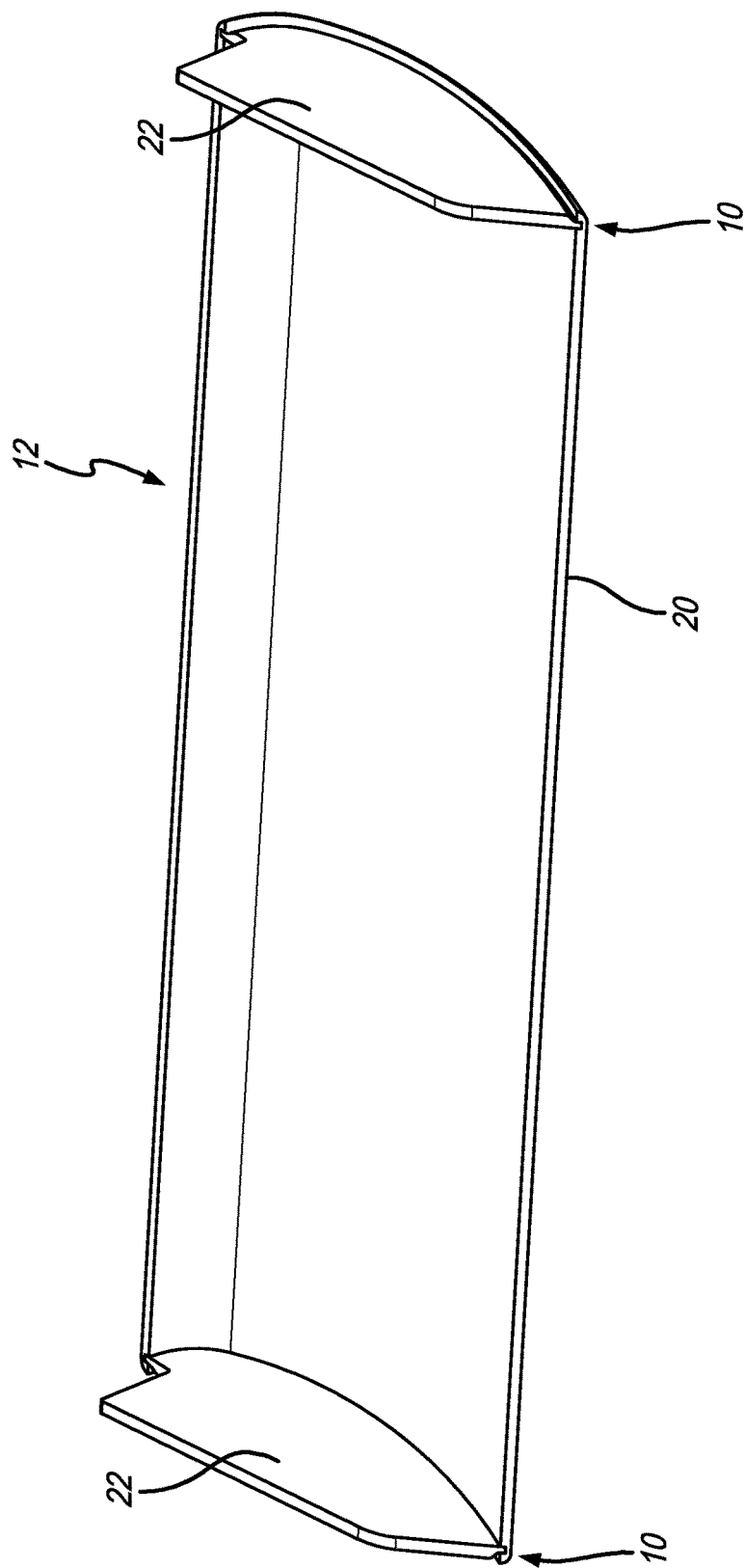
FIG. 2 is a perspective view of a bucket of the pivot showing two corner joints.
Figure 3:
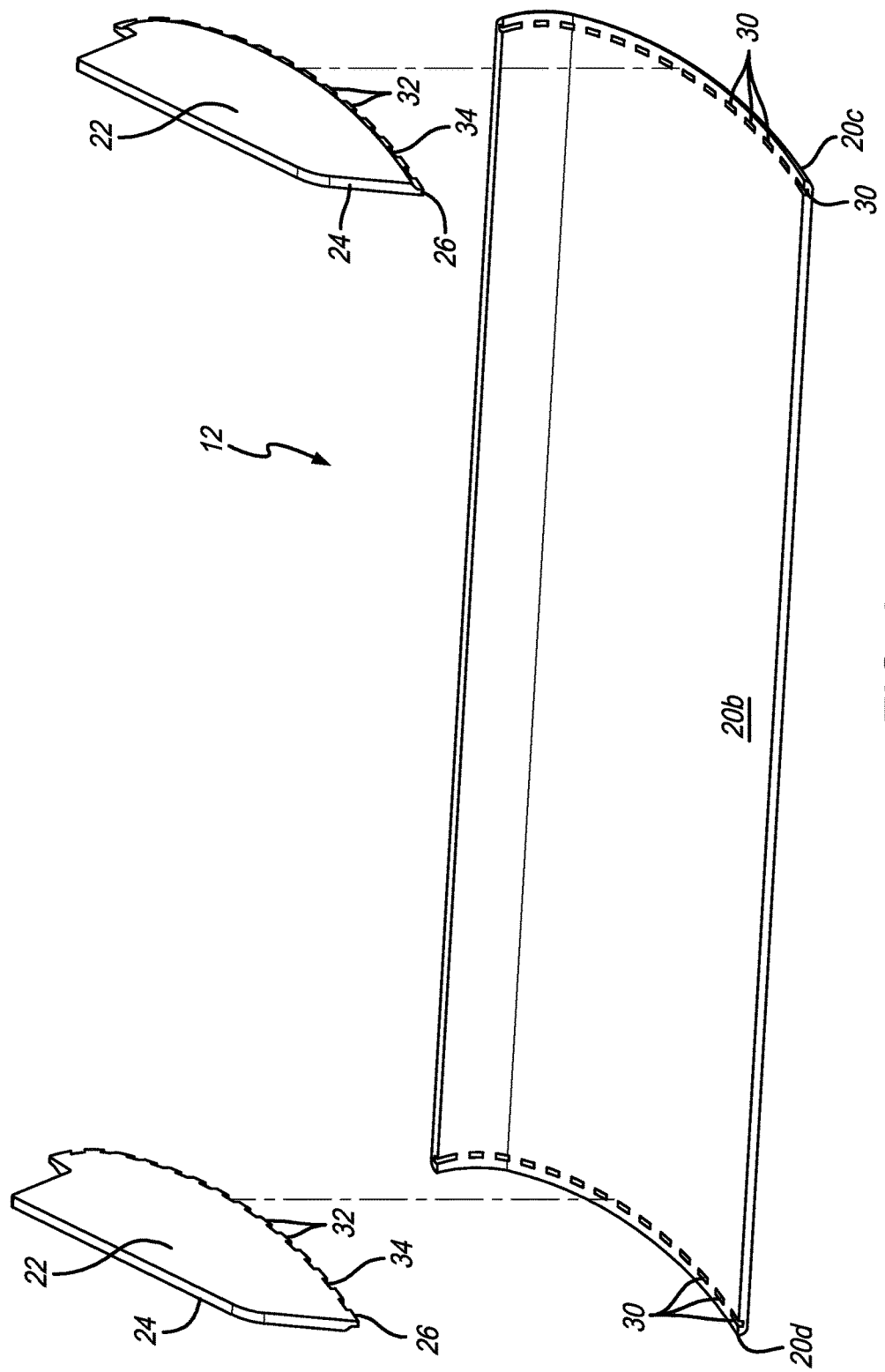
FIG. 3 is an exploded perspective view of the bucket.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to FIGS. 1-6, which are for purposes of illustrating the present invention and not for purposes of limiting the same, the attached drawings show a corner joint construction or assembly 10 for a bucket 12 used on an aircraft pivot bin 14. It will be appreciated that the corner joint construction can be used on other corners or joints in the bin or can be used in other corner joints outside of the aircraft storage bin industry.

In a preferred embodiment, the bin 14 generally includes an upper housing 16 and the bucket 12, which cooperate to define a bin interior 18. The bucket 12 is movable with respect to the upper housing 16 between an open position (right bucket in FIG. 1) and a closed position (left bucket in FIG. 1).

Figure 4:
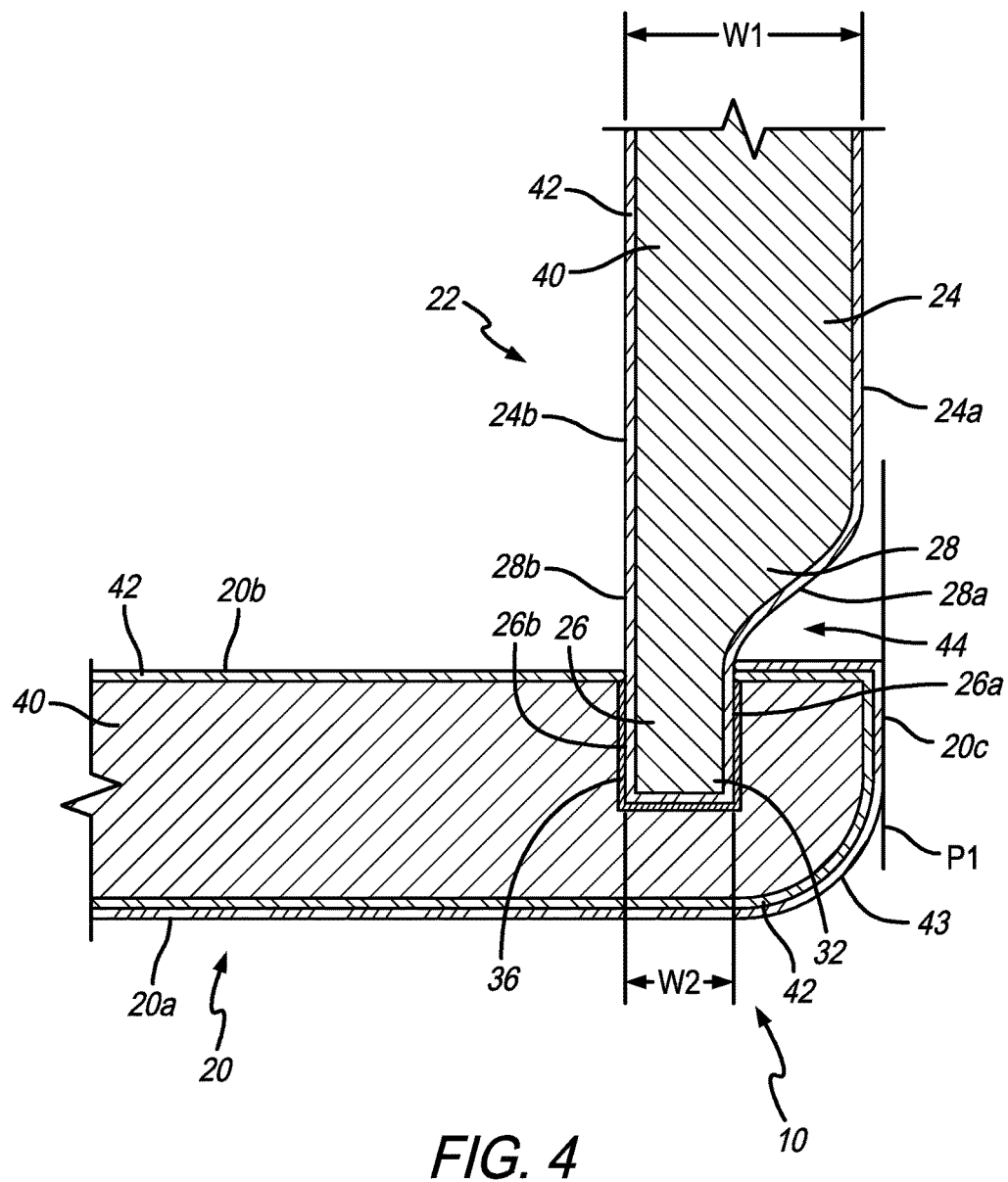
FIG. 4 is a cross-sectional view of the corner joint.

As is best shown in FIG. 4, the bucket 12 includes a bottom 20 and left and right side panels 22 extending upwardly from the bottom 20. The bottom 20 includes a lower surface 20a, an upper surface 20b and right and left outer edges 20c and 20d. The right and left side panels 22 each include a first section 24 having a first transverse width W1, a second section 26 having a second transverse width W2, and a transition section 28 located between the first and second sections 24 and 26. Preferably, the second transverse width W2 is less than the first transverse width W1.

The second section 26 of the right side panel 22 is received in a right side slot 30 defined in the upper surface 20b of the bottom 20 of the bucket 12, such that the right side panel 22 extends upwardly from the bottom 20, and the second section 26 of the left side panel 22 is received in a left side slot 30 defined in the upper surface 20b of the bottom 20 of the bucket 12, such that the left side panel 22 extends upwardly from the bottom 20. In a preferred embodiment, the second section 26 of each of the side panels comprises a plurality of alternating fingers 32 and gaps 34. The fingers 32 are received in the side slots 30. In another embodiment, for each side panel, a single side slot 30 can be defined in the bottom that extends the length of the side panel and the entire second section 26 (instead of a plurality of fingers) can be received in the side slot. It will be appreciated that no matter how the side panels are received in the slot, an adhesive 36 fixes the second section 26 in the slot 30.

As shown in FIG. 4, in a preferred embodiment, the transition section 28 has a transverse width that decreases from the first width to the second width between the first section 24 and the second section 26. Preferably, this decreasing width is provided by the outer surface 24a of the first section tapering in to the outer surface 26a of the second section 26. The outer surface 28a of the transition section 28 can be flat or straight, as shown in FIG. 4 or can be curved. Preferably, the inner surfaces 24b, 26b and 28b of the first, second and transition sections, 24, 26 and 28 are generally parallel of form a continuous vertical surface. In another embodiment, the inner surfaces 24b and 28b of the first and transition sections, 24 and 28 can also taper inwardly to the inner surface 26b of the second section 26.

Figure 5:
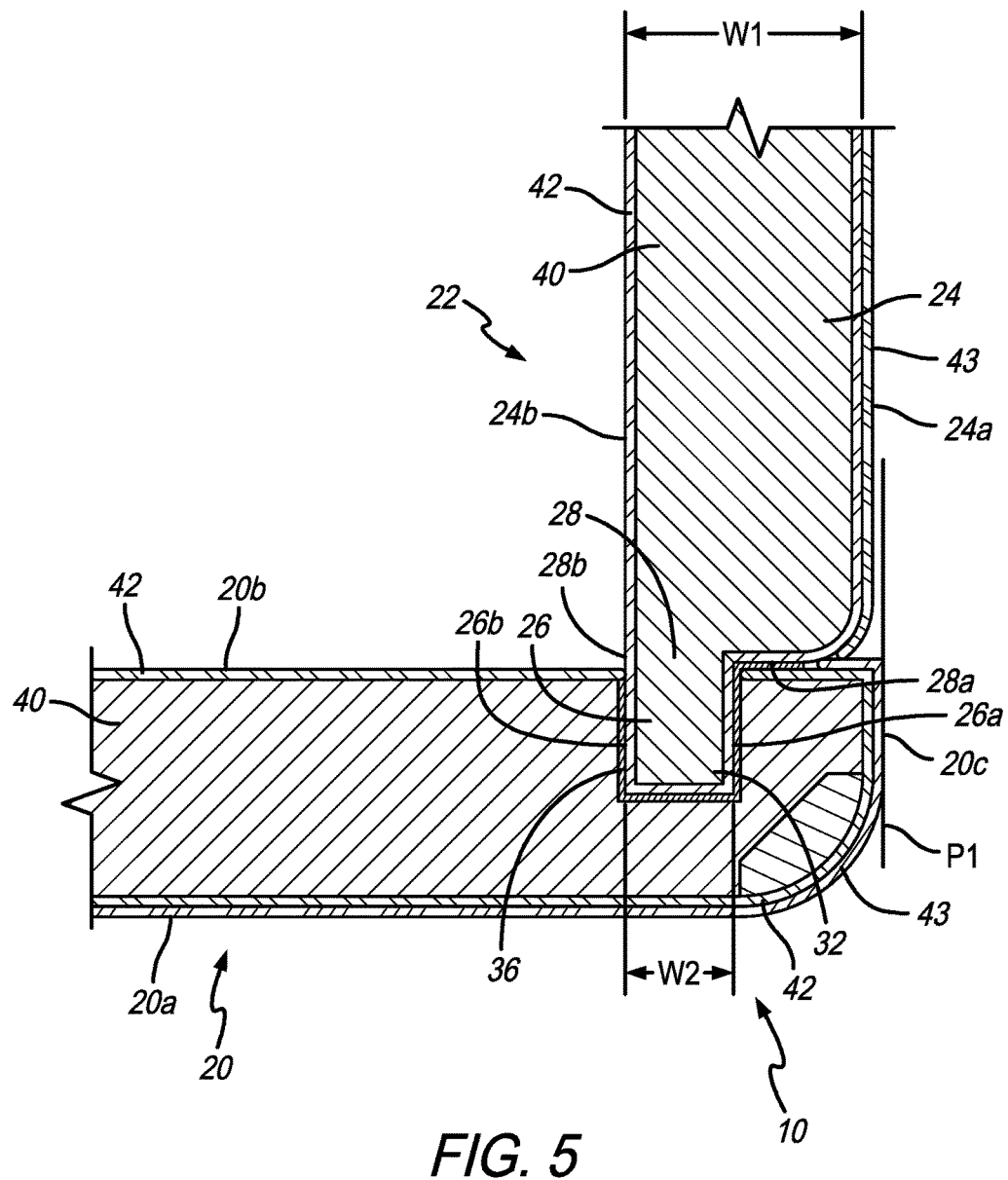
FIG. 5 is a cross-sectional view of a modification of the corner joint.

In another preferred embodiment, as shown in FIG. 5, the transition section 28 is almost nonexistent or very short. In this embodiment, the outer surface of the transition section 28b is a generally horizontal surface.

The geometry of the right and left side panels 22 allows the side panels 22 to be placed close to the right and left outer edges 20c and 20d of the bottom 20. This is shown in FIGS. 4 and 5 with reference to right outer plane P1 defined by the right outer edge 20c of the bottom. As shown, the outer surface 24a of the first section 24 is closer to the right outer plane P1 than the outer surface 26a of the second section 26. In other words, the distance between the outer surface 24a of the first section 24 is less than the distance between the right outer plane P1 and the outer surface 26a of the second section 26. In an embodiment, the outer surface 24a of the first section 24 is parallel to the right outer plane P1 or flush with the right outer edge 20c of the bottom 20.

Figure 6:
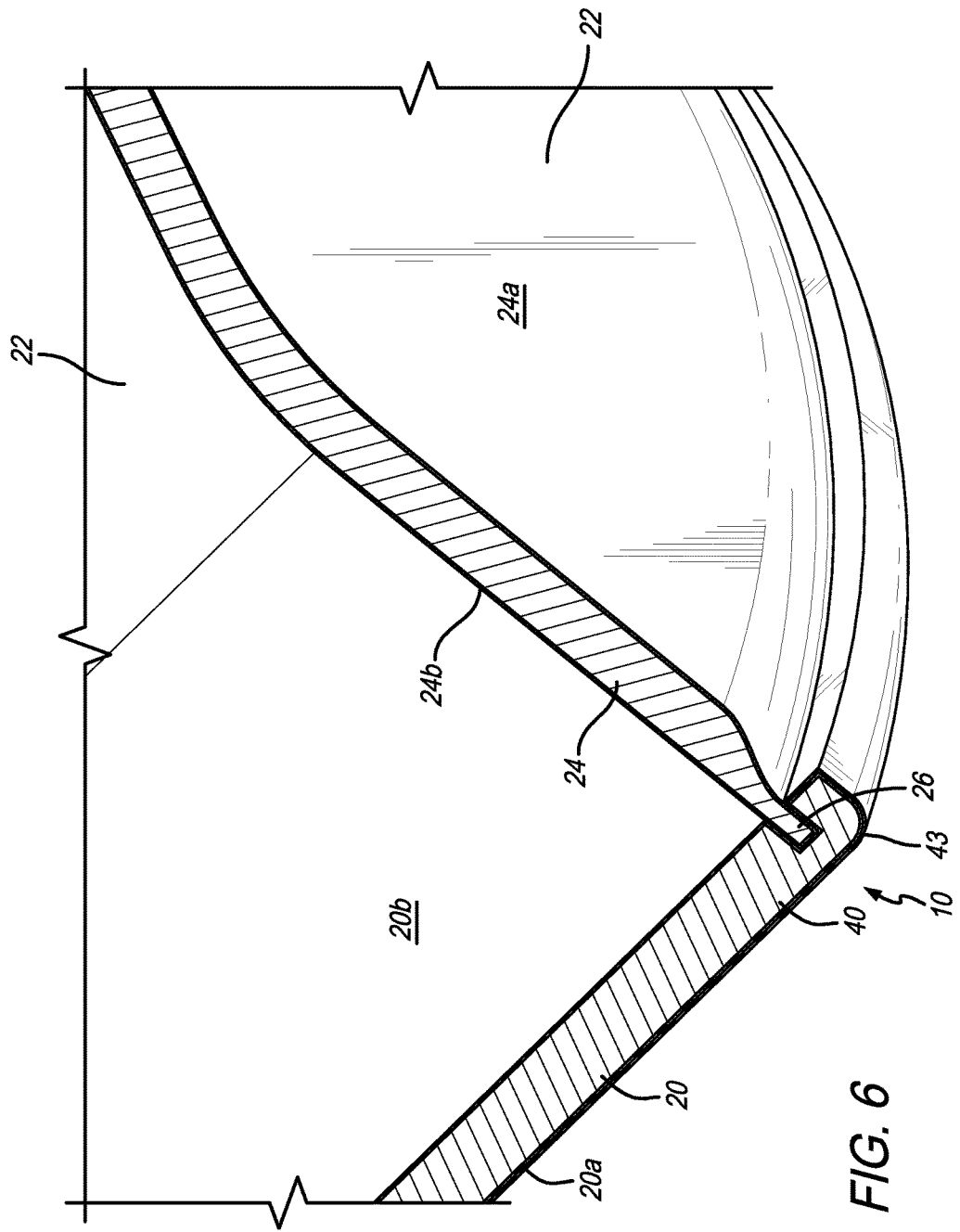
FIG. 6 is a cross-sectional perspective view of a portion of the bucket with the corner joint.

As shown in FIGS. 4-6, in a preferred embodiment, each of the panels (right and left side panels 22 and bottom 20) include a core 40 with skins 42 thereon. Either or both of the panels can also include a decorative layer 43 or skin thereon, as shown in FIG. 4. As shown in FIGS. 4 and 6-8, the transition space 44 created by the crush in (in the transition section 28) between the first section 24 to the second section 26 allows for the decorative layer 43 on the bottom panel 20 to wrap in and be received in the transition space 44.

As shown in FIG. 6, the geometry of the corner assembly 10 provides a smooth, curved edge all along where the bottom 20 joins or meets the side panel 22.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An aircraft storage bin that comprises:
an upper housing, and
a bucket that cooperates with the upper housing to define a bin interior, wherein the bucket is movable with respect to the upper housing between an open position and a closed position, wherein the bucket includes
a bottom that includes a lower surface, an upper surface and right and left outer edges,
a right side panel that includes a first section having a first transverse width and a second section having a second transverse width, wherein a transition section extends from the first section to the second section, wherein the second transverse width is less than the first transverse width, wherein at least a portion of the second section is received in a right side slot defined in the upper surface of the bottom of the bucket, such that the right side panel extends upwardly from the bottom, wherein the first section, second section and transition section of the right side panel each include an inner surface and an outer surface, and wherein a width defined between the outer and inner surfaces of the transition section gradually decreases between the first section and the second section, and wherein the inner surfaces of the first section, the transition section and the second section are parallel to one another and lie in the same plane, and
a left side panel that includes a first section having a first transverse width and a second section having a second transverse width, wherein a transition section extends from the first section to the second section, wherein the second transverse width is less than the first transverse width, wherein at least a portion of the second section is received in a left side slot defined in the upper surface of the bottom of the bucket, such that the left side panel extends upwardly from the bottom, wherein the first section, second section and transition section of the left side panel each include an inner surface and an outer surface, and wherein a width defined between the outer and inner surfaces of the transition section of the left side panel gradually decreases between the first section and the second section of the left side panel, and wherein the inner surfaces of the first section, the transition section and the second section of the left side panel are parallel to one another and lie in the same plane.

2. The aircraft storage bin of claim 1 wherein the first section of the right side panel has an outer surface and an inner surface, wherein the first section of the left side panel has an outer surface and an inner surface, wherein the right outer edge defines a right outer plane and the left outer edge defines a left outer plane, wherein the outer surface of the first section of the right side panel is closer to the right outer plane than the outer surface of the second section of the right side panel, and wherein the outer surface of the first section of the left side panel is closer to the left outer plane than the outer surface of the second section of the left side panel.

3. The aircraft storage bin of claim 1 wherein the second section of the right side panel comprises a plurality of fingers extending downwardly from the transition section that are received in a plurality of right side slots defined in the upper surface of the bottom, and wherein the second section of the left side panel comprises a plurality of fingers extending downwardly from the transition section that are received in a plurality of left side slots defined in the upper surface of the bottom.

4. The aircraft storage bin of claim 1, wherein the outer surfaces of the first section, transition section and the second section of each panel are not parallel to one another.

5. The aircraft storage bin of claim 1 wherein a transition space is defined by an outer surface of the transition section and the upper surface of the bottom, and wherein a decorative layer is secured to the upper surface of the bottom within the transition space.

6. The aircraft storage bin of claim 5 wherein an end of the decorative layer is positioned adjacent to the outer surface of the transition section.

7. An aircraft storage bin that comprises:
an upper housing, and
a bucket that cooperates with the upper housing to define a bin interior, wherein the bucket is movable with respect to the upper housing between an open position and a closed position, wherein the bucket includes
a bottom that includes a lower surface, an upper surface and right and left outer edges, wherein the right outer edge defines a right outer plane and the left outer edge defines a left outer plane,
a right side panel that includes a first section having an outer surface, an inner surface and a first transverse width, and a second section having an outer surface, an inner surface and a second transverse width, wherein a transition section extends from the first section to the second section, wherein the second transverse width is less than the first transverse width, wherein at least a portion of the second section is received in a right side slot defined in the upper surface of the bottom of the bucket, such that the right side panel extends upwardly from the bottom, wherein the outer surface of the first section of the right side panel is closer to the right outer plane than the outer surface of the second section of the right side panel, wherein the transition section of the right side panel includes an inner surface and an outer surface, wherein a width defined between the outer and inner surfaces of the transition section of the right side panel gradually decreases between the first section and the second section, and wherein the second section of the right side panel comprises a plurality of fingers extending downwardly from the transition section that are received in a plurality of right side slots defined in the upper surface of the bottom, and
a left side panel that includes a first section having an outer surface, an inner surface and a first transverse width, and a second section having an outer surface, an inner surface and a second transverse width, wherein a transition section having an outer surface and an inner surface extends from the first section to the second section, wherein the second transverse width is less than the first transverse width, wherein at least a portion of the second section is received in a left side slot defined in the upper surface of the bottom of the bucket, such that the left side panel extends upwardly from the bottom, wherein the outer surface of the first section of the left side panel is closer to the left outer plane than the outer surface of the second section of the left side panel, wherein the transition section of the left side panel includes an inner surface and an outer surface, wherein a width defined between the outer and inner surfaces of the transition section of the left side panel gradually decreases between the first section and the second section, and wherein the second section of the left side panel comprises a plurality of fingers extending downwardly from the transition section that are received in a plurality of left side slots defined in the upper surface of the bottom.

8. The aircraft storage bin of claim 7, wherein the inner surfaces of the first section, the transition section and the second section are parallel to one another, wherein the outer surfaces of the first section and the second section are parallel to one another, and wherein at least a portion of the outer surface of the transition section is not parallel and not perpendicular to the outer surfaces of the first and second sections.

9. The aircraft storage bin of claim 8 wherein a transition space is defined by an outer surface of the transition section and the upper surface of the bottom, and wherein a decorative layer is secured to the upper surface of the bottom within the transition space.

10. The aircraft storage bin of claim 9 wherein an end of the decorative layer is positioned adjacent to the outer surface of the transition section.

11. A bucket configured to be used with aircraft storage bin, wherein the bucket comprises:
a bottom that includes a lower surface, an upper surface and right and left outer edges,
a right side panel that includes a first section having a first transverse width and a second section having a second transverse width, wherein a transition section is located between the first and second sections, wherein the second transverse width is less than the first transverse width, wherein at least a portion of the second section is received in a right side slot defined in the upper surface of the bottom of the bucket, such that the right side panel extends upwardly from the bottom, wherein the transition section of the right side panel includes an inner surface and an the bottom, wherein the first section, second section and transition section of the right side panel each include an inner surface and an outer surface, and wherein a width defined between the outer and inner surfaces of the transition section gradually decreases between the first section and the second section, and wherein the inner surfaces of the first section, the transition section and the second section are parallel to one another and lie in the same plane, and
a left side panel that includes a first section having a first transverse width and a second section having a second transverse width, wherein a transition section is located between the first and second sections, wherein the second transverse width is less than the first transverse width, wherein at least a portion of the second section is received in a left side slot defined in the upper surface of the bottom of the bucket, such that the left side panel extends upwardly from the bottom, wherein the first section, second section and transition section of the left side panel each include an inner surface and an outer surface, and wherein a width defined between the outer and inner surfaces of the transition section of the left side panel gradually decreases between the first section and the second section of the left side panel, and wherein the inner surfaces of the first section, the transition section and the second section of the left side panel are parallel to one another and lie in the same plane.

12. The bucket of claim 11 wherein the first section of the right side panel has an outer surface and an inner surface, wherein the first section of the left side panel has an outer surface and an inner surface, wherein the right outer edge defines a right outer plane and the left outer edge defines a left outer plane, wherein the outer surface of the first section of the right side panel is closer to the right outer plane than the outer surface of the second section of the right side panel, and wherein the outer surface of the first section of the left side panel is closer to the left outer plane than the outer surface of the second section of the left side panel.

13. The bucket of claim 11 wherein the second section of the right side panel comprises a plurality of fingers extending downwardly from the transition section that are received in a plurality of right side slots defined in the upper surface of the bottom, and wherein the second section of the left side panel comprises a plurality of fingers extending downwardly from the transition section that are received in a plurality of left side slots defined in the upper surface of the bottom.

14. The aircraft storage bin of claim 11, wherein the outer surfaces of the first section, transition section and the second section of each panel are not parallel to one another.

15. The bucket of claim 11 wherein a transition space is defined by an outer surface of the transition section and the upper surface of the bottom, and wherein a decorative layer is secured to the upper surface of the bottom within the transition space.

16. The bucket of claim 15 wherein an end of the decorative layer is positioned adjacent to the outer surface of the transition section.

\* \* \* \* \*